Nov. 17, 1959 W. SCHROEDER 2,912,906
MACHINE TOOL TRANSMISSION
Filed Sept. 9, 1955 4 Sheets-Sheet 1

INVENTOR.
WALTER SCHROEDER.
BY
H. K. Parsons & L. W. Wright.
ATTORNEYS.

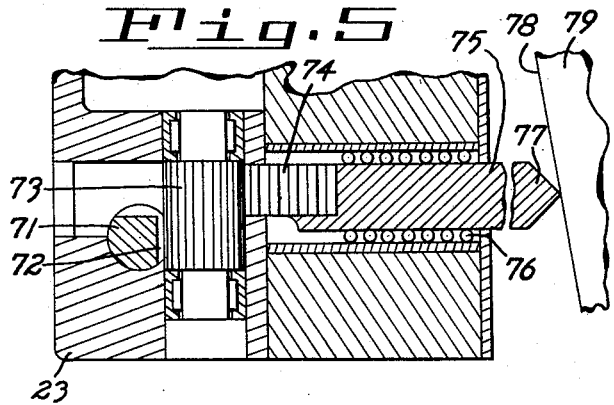
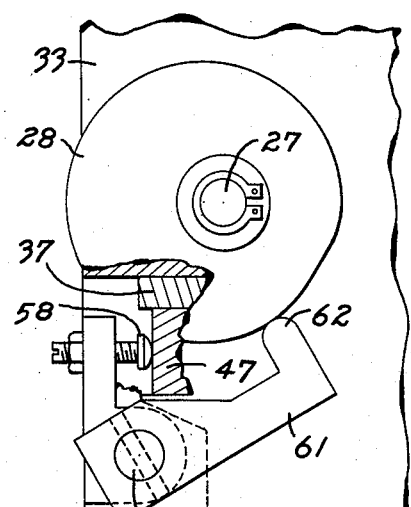
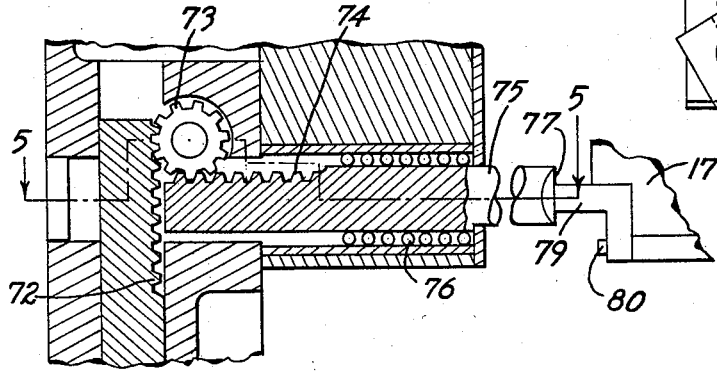
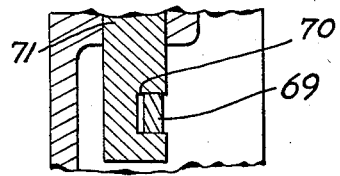
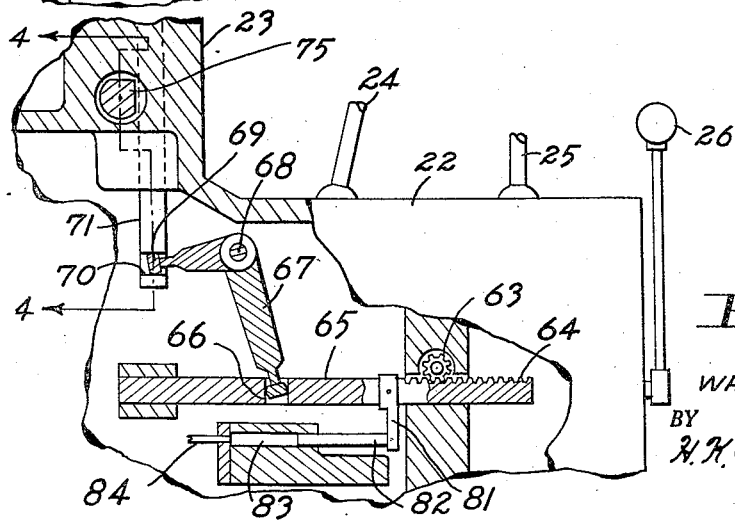
INVENTOR.
WALTER SCHROEDER.
BY
H. K. Parsons & C. W. Wright
ATTORNEYS.

Nov. 17, 1959  W. SCHROEDER  2,912,906
MACHINE TOOL TRANSMISSION
Filed Sept. 9, 1955  4 Sheets-Sheet 3
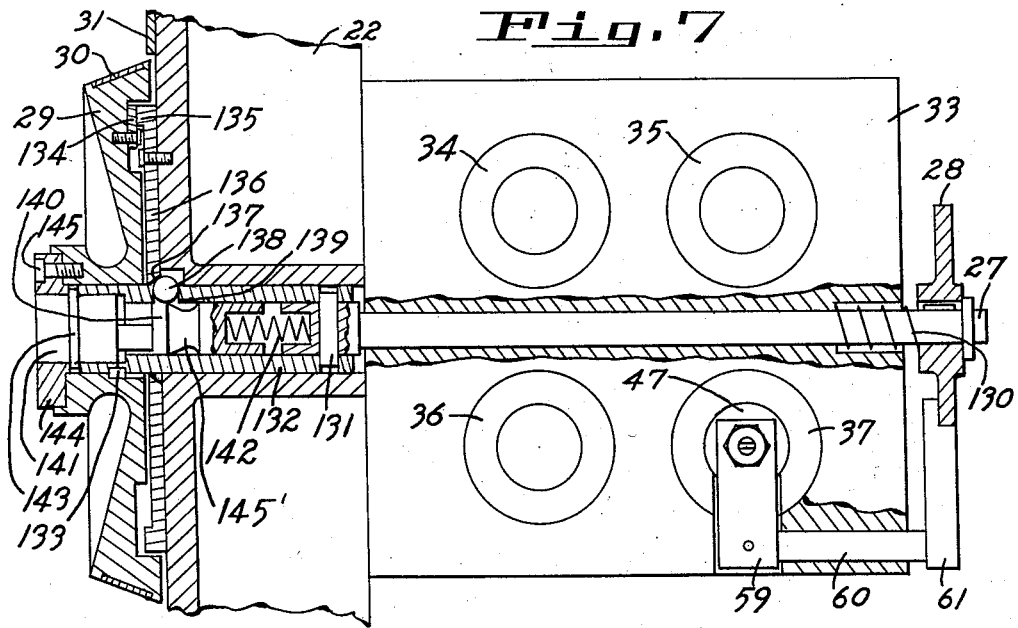
Fig. 7
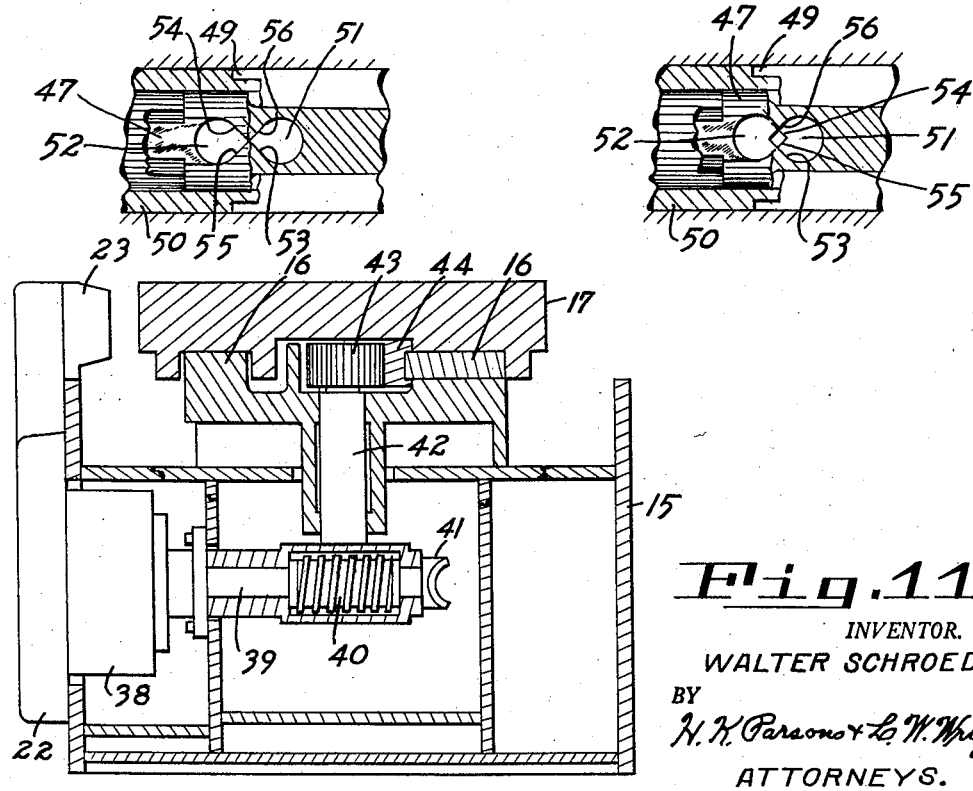
Fig. 9  Fig. 10
Fig. 11
INVENTOR.
WALTER SCHROEDER.
BY
H. K. Parsons + L. W. Wright
ATTORNEYS.

Nov. 17, 1959 — W. SCHROEDER — 2,912,906
MACHINE TOOL TRANSMISSION
Filed Sept. 9, 1955 — 4 Sheets-Sheet 4

INVENTOR.
WALTER SCHROEDER.
BY
N. W. Parsons + L. W. Wright
ATTORNEYS.

United States Patent Office 2,912,906
Patented Nov. 17, 1959

2,912,906

MACHINE TOOL TRANSMISSION

Walter Schroeder, Cincinnati, Ohio, assignor to The Cincinnati Milling Machine Co., Cincinnati, Ohio, a corporation of Ohio Application September 9, 1955, Serial No. 533,402

8 Claims. (Cl. 90—21.5)

This invention relates to improvements in machine tools and has particular reference to an improved structure for control of the table movement of milling machines or similar machine tools.

One of the objects of the present invention is the provision of an improved hydraulic actuating circuit for effecting reciprocation of a machine tool table.

A further object of the invention is the provision in connection with said hydraulic actuating circuit of a novel and improved structure for determining the rate of movement of said table.

A further object of the invention is the provision in connection with said rate control mechanism of means for effecting alternatively a manual selection or an automatic variation as respects the rate of table movement.

Additionally, the invention has for its object the provision of a simple, compact and efficient machine tool table operating and control mechanism having an improved structural arrangement of parts for determination of table operation.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 3 is a fragmentary longitudinal section of the control mechanism on the line 3—3 of Figure 2.

Figure 4 is a fragmentary section of the automatic rate control plunger mechanism on the line 4—4 of Figure 3.

Figure 5 is a view partially in cross section as on the line 5—5 of Figure 4.

Figure 6 is a view with parts broken away of the rate control cam and associate parts looking in the direction of the arrows 6—6 of Figure 2.

Figure 7 is a section as on the line 2—2 of Figure 1 showing certain structural modifications.

Figure 9 is a fragmentary section of the rate throttling valve as on the line 9—9 of Figure 8.

Figure 10 is a similar section showing a different adjustment of the throttle, and Figure 11 is a transverse section of the table and mechanical drive connections.

Figures 1, 2:
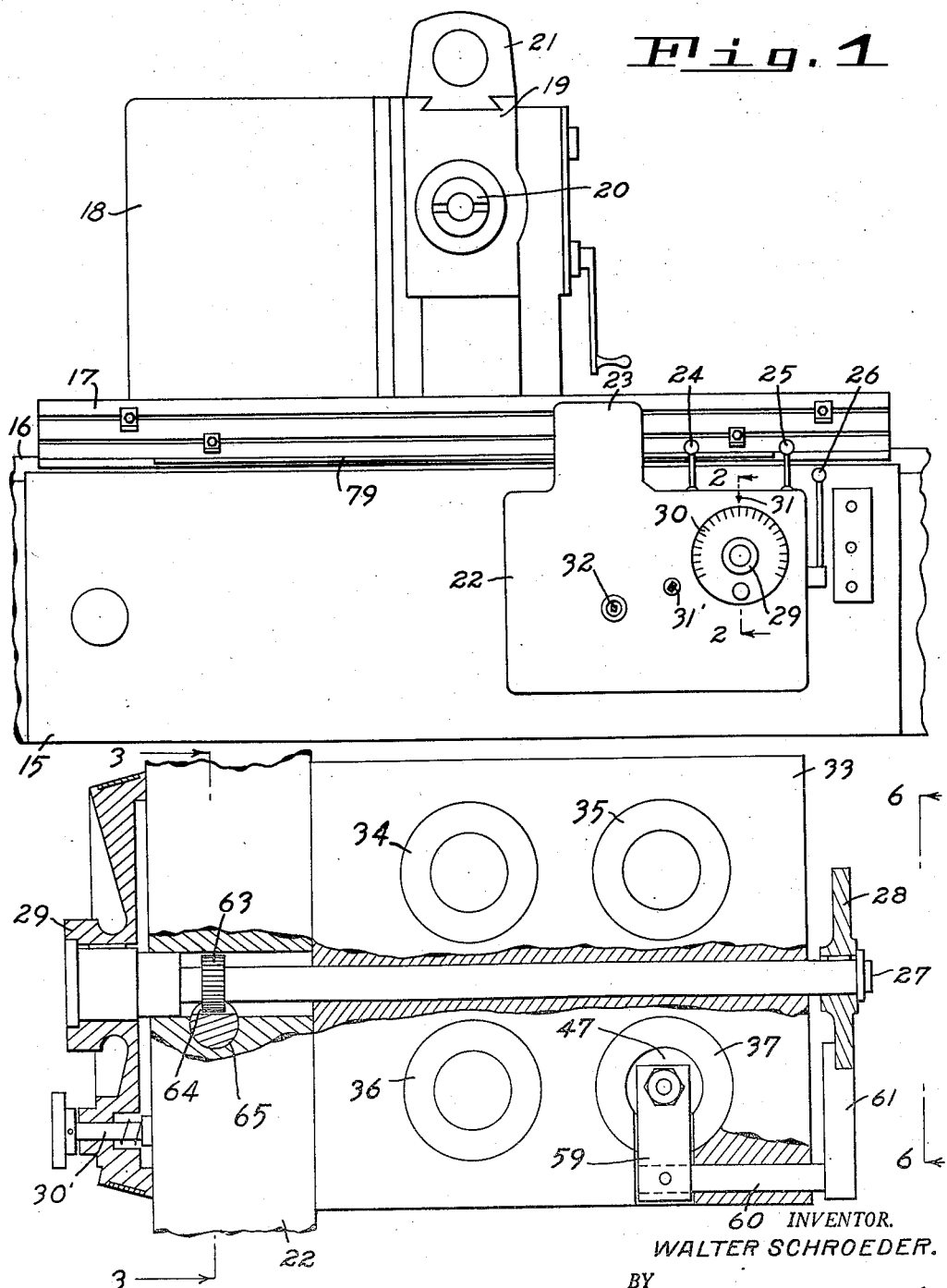
Figure 1 is a front elevation of a machine embodying the present invention.
Figure 2 is a transverse section on the line 2—2 of Figure 1.

In the drawings the numeral 15 designates the bed of a milling machine having ways 16 for the reciprocating table 17. Rising from the bed is the column 18 mounting the vertically adjustable spindle carrier 19 supporting the cutter spindle 20 and overarm 21.

Secured on the front of the bed 15 is the control block or unit 22 having a portion 23 overlying the front of the table 17. This bracket supports the control lever 24 shiftable into four control positions for determining the feed or rapid traverse movement and direction of movement or reversal of the table 17. Additionally, it supports the start-stop control lever 25 and spindle control lever 26. Journaled for rotation in the block 22 is the rate control shaft 27 having keyed on its inner end the rate control cam 28 and on its forward end, as shown in Figure 2, the dial knob 29 provided with the scale 30 cooperating with pointer 31 on the face of the block for indicating the selected or existing feed rate as determined by the setting of the cam 28. This knob 29 may be manually turned for feed rate selection and locked in adjusted position by the spring pressed pin 30' or alternatively may be automatically actuated as hereinafter described. The block 22 also carries the selector knob 31' controlling the automatic variable feed rate operation and the shaft 32 adapted to receive a crank for effecting manual movement of the table.

Slidably mounted in the hydraulic connection block 33 are the main control valves for machine operation comprising basically the feed rapid traverse selector valve 34, and the reversing valve 35. These valves are operatively connected in conventional manner for control by the four selective movements of the lever 24, and block 33 additionally mounts the start-stop valve 36 and the rate control valve 37. The hydraulic detail of these several valves has been illustrated in Figure 8.

As indicated in Figure 11, power movement is transmitted to the table 17 by the hydraulic motor 38 secured on a driving shaft 39. This shaft is journaled in the bed 15 and provided with worm 40 rotating worm gear 41 on the vertical shaft 42. This shaft operates pinion 43 in mesh with the longitudinally extending rack 44 on the underside of the table 17 for effecting controlled longitudinal movements of the table. The specific details of a preferred embodiment of the foregoing table drive transmission are shown in my co-pending application, Serial No. 527,676. The hydraulic motor 38 is driven by hydraulic pressure medium supplied by the pressure pumps 45 and 46 through the valving and circuit controls indicated in detail in Figure 8. The rate of actuation of the motor 38 is determined by the setting of the throttle plunger 47 of the rate valve 37, this throttle being preferably effective in the return or discharge conduit 48 of the motor. This conduit is coupled with the valve groove 49 of the valve casing 50 having the ports 51 communicating with the bore of the casing in which the valve 47 slides.

Particular attention is invited to the shape of these ports 51 and the cooperating porting portions 52 of the plunger 47. The shape is similar but oppositely disposed in that while the respective ports have a generally substantially circular form, their contiguous portions which, as the valve is opened, are moved into overlapping relation as indicated in Figure 10, are flat-sided or defined by right angle intersecting tangents, such as 53, 54, and 55, 56. As a result the variably sized throttling aperture in place of being constituted by a valve edge variably intersecting a circular port remains substantially in the form of a square of variable size. As a result of this particular configuration the edge flow characteristics at the throttle remain constant, and there is a constant throttle increase proportionate to variable relative linear movement of the parts in place of a varying proportion between actual throttle effect and amount of linear movement as has existed in prior art constructions.

Figure 8:
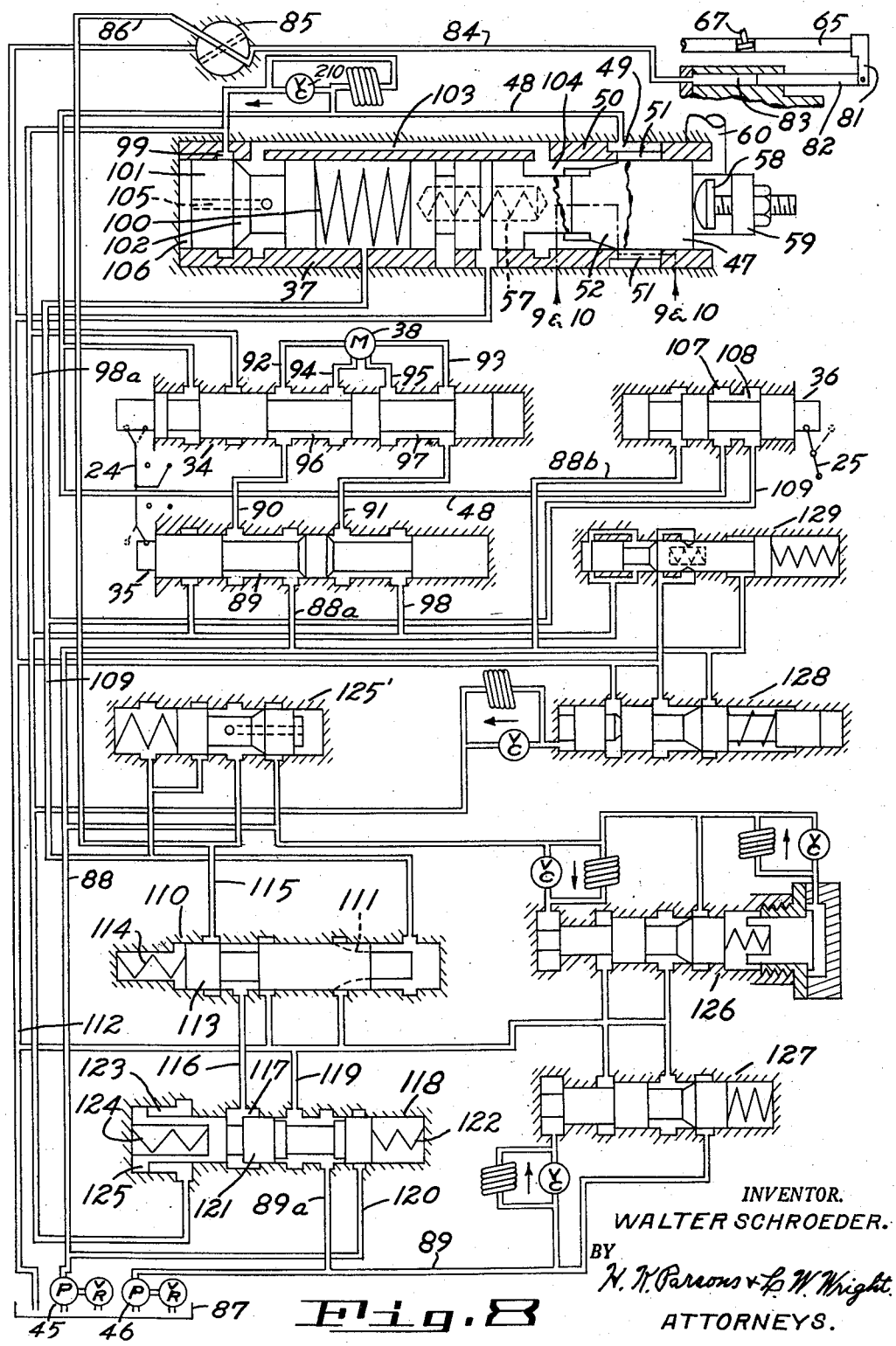
Figure 8 is a diagram of the present improved hydraulic circuit.

As indicated in the upper portion of Figure 8, the valve member 47 is urged in a right hand throttle opening direction by the contained spring 57, this movement being resisted by adjustable abutment 58 carried by the arm 59 pinned to rock shaft 60 which is journaled in the block 33 as indicated in Figures 2 and 7. The rear end of rock shaft 60 has secured thereon the cam follower arm 61 having the contact portion 62 (Fig. 6) riding the periphery of the rate control cam 28. By this construction any rotation or oscillatory movement of shaft 27 will correspondingly turn cam 28 and react through the arms 61 and 59 variably to position the throttling plunger 47.

For automatic control of this movement shaft 27 is provided with pinion 63 engaging rack 64 on the rod or plunger 65 slidably mounted in the block 22. The plunger rod 65 has a recess at 66 (Fig. 3) to receive the terminus of arm 67 pivoted at 68 to the member 33 and having a second arm 69 whose terminus is engaged in recess 70 of the motion transmitting rod or plunger 71 having a rack 72 (Fig. 4) interfitting with the elongated pinion 73, rotatably supported by the member 23.

Additionally meshing with the pinion 73 is the actuating rack 74 on the sliding plunger 75 supported by anti-friction bearings 76 and having its V point 77 in engagement with the suitably contoured forward edge 78 of the rate control cam 79 secured on the front of the table 17 by the bolts 80. It will be evident that as the edge 78 is translated with the table past the contacting edge of the point 77 that this edge will control the position of the point and thus of the linkage just described intervening the point and the rate valve actuating cam 28.

While various spring or other mechanism may be employed for urging the plunger 75 inwardly I prefer to employ a structure in the nature of a hydraulic spring as shown in Figure 3. This includes the arm 81 secured to the plunger 65 and having connected to its lower end the piston element 82 slidable in cylinder 83 to which is connected conduit 84. A selector valve 85, operable by the selector 31', when turned to the position shown in Figure 8 connects pressure conduit 86 with conduit 84 to maintain a yieldable hydraulic pressure or hydraulic spring reaction against the piston and linkage to urge the plunger 75 against the cam while permitting yielding movement as the point 77 rides on a forwardly extending portion of the surface 78 of the nature shown in Figure 5.

The elemental parts for hydraulic actuation and control of table operation have been diagrammatically illustrated in connection with Figure 8. They comprise primarily a reservoir for hydraulic fluid or actuating medium 87. A first hydraulic pressure supply conduit system 88 is connected to the pump 45 which has a relatively low delivery capacity as for example five gallons a minute, and a second hydraulic pressure conduit supply system 89 is coupled to the pump 46 having a high delivery capacity, as for example, 14½ gallons a minute. A primary connection of the conduit 88 is the branch conduit 88a coupled with the pressure groove 89 of the reversing valve 35 which selectively connects this pressure groove with either conduit 90 extending to the left hand portion or conduit 91 extending to the right hand portion of the casing of the feed rapid traverse selector valve 34. The motor 38 here utilized is of a dual bank type having the first pair of motor conduits 92 and 93 permanently coupled with the conduits 90 and 91 from the valve 35 and therefore subject to the reversible pressure or discharge coupling conditions established by positioning of the valve 35. The motor has a second pair of conduits 94 and 95.

In the position shown, conduit 94 receives pressure from conduit 90 by way of valve groove 96, while conduit 95 is coupled to what is then discharge conduit 91 by valve groove 97. Movement of valve 34 from the position shown toward the right will interconnect conduits 94 and 95 by way of groove 96, short-circuiting one of the banks of cylinders so that the available volume of hydraulic actuating medium under pressure produced by the pumps 45 and/or 46 will be solely effective against a single bank of motor cylinders for rapid traverse purposes.

The parts being in the relationship indicated, the discharge from the hydraulic motor 38 will be by way of 91, the right hand portion of valve 35, conduit 98, 98a to the inlet port 99 at the left hand end of the rate valve unit 37. This rate valve includes the pressure reducing valve 101 normally urged toward the left by the contained spring 100 which moves the reducing valve 101 toward an open position, the discharged fluid from the motor flowing past the taper throttle 102 of valve 101 and by way of interdrilled passage or conduit 103 to the bore or area 104 circumscribing valve 47.

Valve 101 is interdrilled at 105 providing communication with the chamber 106. Throttling or resistance to discharge flow through the conduit 103 will cause a building up of pressure in the chamber 106 urging the valve 101 toward the right in opposition to the force of spring 100 to maintain a constant pressure drop between conduit 98a and conduit 103 so that the flow through the variable throttle aperture at 51—52 will be a constant for a given setting of the throttle irrespective of actual actuating pressures involved. The emergent flow from the throttle port groove 49 is by way of conduit 48 to groove 107 of the table start and stop valve 36.

In the position shown in Figure 8, this flow is then coupled by way of groove 108 in the valve and conduit 109 to the main discharge valve 110. This valve has a throttling portion 111 resisting discharge flow into the return conduit system 112. The amount of this flow past throttle 111 tends to move the plunger valve 113 toward the left against the pressure of spring 114. As the valve plunger 113 moves to the left, the pilot pressure conduit 115 is connected by the valve with conduit 116 extending to chamber 117 of the combining valve 118 moving the plunger 121 of the separating valve plungers 121 and 125 to the right, shutting off flow from the pump 46 to return line 119 and coupling the large volume pressure conduit 89a with the branch conduit 120 leading to conduit 88. In this manner as the volume of the discharge flow created by pump 45 approaches the maximum capacity of the pump 45 it serves automatically to shift the flow combining valve plunger 121 against the force of spring 122, automatically cutting in the high volume pump and rendering the combined amount of the two pump volumes available for higher feed rate purposes.

Under these operating conditions, the branch conduit 88b from pressure line 88 to the table start-stop valve 36 is blocked, but when this valve 36 is shifted to the right as indicated by the dotted line in Figure 8, line 109 will be blocked and the pressure conduit 88b will be coupled through the valve with conduit 48. This pressure will react through the one way check valve 210 and back through the reversing valve 35 and traverse control valve 34 to the then existing exhaust or return side of the hydraulic motor 38. In this manner, immediately upon shifting of the valve 36 a balanced pressure condition is created on both sides of the motor bringing the motor and thus the coupled table to an immediate accurate stop.

It will be noted that when the plunger of the rapid traverse valve 34 is moved to the right, the return conduit system from the reversing valve 35 normally coupled through conduit 98a to the throttle valve is now coupled with conduit 48 through valve 34, bypassing the rate valve and permitting high volume discharge from the pump through the start-stop valve for rapid traverse purposes. This by-passing or relief of pressure in the conduit 98a causes a pressure drop in the cylinder 123 allowing spring 124 to move the control piston 125 to the right, correspondingly shifting the valve spool 121 to such a position that the flow from the pumps 45 and 46 is automatically combined, rendering the full combined pump flow available for rapid traverse purposes.

The foregoing constitute the essential circuitry and valving relating to control of rate and direction of movement of the reciprocating machine tool table 17. Additionally, there has been indicated in the drawing the pressure reducing valve 125' intervening the pump pressure conduit system 88 and the pilot circuit conduit system 86, this valve serving to maintain a pressure, for example, of 150 pounds in the pilot circuit available for the purposes above described and additionally, as will be understood, for operation of other elements of the machine not here specifically illustrated. Likewise, for determination of existing operating pressures for table actuation there has been shown the hydraulically controlled pressure relief valve 126 effective as respects the pressure conduit system 88 limiting this pressure, for instance, to 1000 pounds as when the machine is being used for slow cutting against appreciable work and cutter resistance. There has additionally been provided the lower pressure relief valve 127 controlling the pressure in the conduit system 89 adapted to maintain, for example, a 400 pound pressure in the actuating system when the higher volume pressure supply pump 46 is being utilized.

There has also been provided in the system a back pressure relief valve 128 and leakage compensating valve 129. When it is desired to operate the machine purely under manual control, and particularly when it is desired to lock the machine for operation at a definite feed rate and prevent accidental or unauthorized change of such feed rate, use may be made of the manual rate control structure shown in Figure 7. As there shown, the spindle 27 is mounted for axial sliding movement, being inwardly urged or to the right in Figure 7 by the spring 130 while at its forward end there is secured to the spindle by the pin 131 the sliding sleeve 132 to which the dial 29 is keyed at 133. The dial has the inner toothed portion 134 for selective interlocking engagement with the index teeth 135 on the circular plate 136 secured to the block 22. The plate 136 is provided with sockets such as shown at 137 to receive detent balls such as 138 freely movable in apertures 139 in the sleeve 132. The parts are shown in locked position in Figure 7, the ball 138 being forced upward into recess 137 by shoulder 140 on the slidable locking plunger 141 outwardly urged with respect to the sleeve 132 by the spring 142. This plunger is provided with a shoulder 143 engaged by the removable cap 144 secured to dial 29 by bolts 145. When bolts 145 are loosened the cap and plunger will be moved outwardly by spring 142, permitting the balls to drop into the groove 145', releasing the detent of the sleeve 132 so that the dial sleeve and spindle may be moved outwardly against the force of spring 130 and rotated to the desired feed selecting position. When at this position the cap 144 is replaced and secured in position, forcing the plunger 141 inwardly and moving the balls out into the locking position shown in Figure 7. This action will hold the teeth 134 and 135 in selected interlocked position and prevent rotation of the dial and thus of the rate control cam.

From the foregoing description taken in connection with the drawings it will be noted that there has been provided an improved form of hydraulic control transmission for machine tools which due to the employment of the individual and additive pump factors makes possible an extremely wide range of feeding operations as well as rapid traverse which may be accentuated by partially short circuiting the hydraulic operating motor. It will further be noted that there has been provided an improved system of this character in which the demands as to feeding rate automatically hydraulically control the individual or additive utilization of said volumetric determining hydraulic pressure medium suppliers or pumps, while an improved form of rate control mechanism effective preferably as respects the motor discharge line accurately controls the rate of movement while maintaining suitable overall pressure in the hydraulic system eliminating chatter or other surge or irregular movement conditions.

Additional attention is invited to the fact that by the present improved type of throttle and throttle control mechanism, the feed rate may be automatically varied and controlled during the entire machining operation.

What is claimed is:

1. A machine tool of the character described including a bed, a table mounted for translation on the bed, a transmission for effecting movement of the table on the bed, said transmission including a hydraulic motor coupled with the table and a source of hydraulic power for actuation of the motor, and rate control means for the motor including a variably positionable throttle valve, a cam for controlling the position of said valve, an actuating shaft journaled in the bed and supporting said cam, a dial on the shaft exterior to the bed for adjusting the cam variably to determine the position of the throttle valve, and means for transmitting motion from the cam to the valve including a rock shaft supported by the bed, a valve actuating arm carried by the rock shaft, and a follower arm carried by the rock shaft having a follower for engagement with the cam and movable by rotation of the cam and its supporting shaft variably to rock the rock shaft for positioning of the valve.

2. A machine tool of the character described including a bed, a table mounted for translation on the bed, a transmission for effecting movement of the table on the bed, said transmission including a hydraulic motor coupled with the table and a source of hydraulic power for actuation of the motor, and rate control means for the motor including a variably positionable throttle valve, a cam for controlling the position of said valve, an actuating shaft journaled in the bed and supporting said cam, a dial on the shaft exterior to the bed for adjusting the cam variably to determine the position of the throttle valve, means for transmitting motion from the cam to the valve including a rock shaft supported by the bed, a valve actuating arm carried by the rock shaft, a follower arm carried by the rock shaft having a follower for engagement with the cam and movable by rotation of the cam and its supporting shaft variably to rock the rock shaft for positioning of the valve, a rate control plunger carried by the bed and projecting adjacent the table for engagement with a control cam on the table, and motion transmitting linkage connecting the plunger and cam shaft for effecting rotation of the cam and cam shaft in accordance with movements of the plunger.

3. A machine tool of the character described including a bed, a table mounted for translation on the bed, a transmission for effecting movement of the table on the bed, said transmission including a hydraulic motor coupled with the table and a source of hydraulic power for actuation of the motor, and rate control means for the motor including a variably positionable throttle valve, a cam for controlling the position of said valve, an actuating shaft journaled in the bed and supporting said cam, a dial on the shaft exterior to the bed for adjusting the cam variably to determine the position of the throttle valve, means for transmitting motion from the cam to the valve including a rock shaft supported by the bed, a valve actuating arm carried by the rock shaft, a follower arm carried by the rock shaft having a follower for engagement with the cam and movable by rotation of the cam and its supporting shaft variably to rock the rock shaft for positioning of the valve, a rate control plunger carried by the bed and projecting adjacent the table for engagement with a control cam on the table, motion transmitting linkage connecting the plunger and cam shaft for effecting rotation of the cam and cam shaft in accordance with movements of the plunger, and means for resiliently urging the plunger in a direction toward the table.

4. A machine tool of the character described including a bed, a table mounted for translation on the bed, a transmission for effecting movement of the table on the bed, said transmission including a hydraulic motor coupled with the table and a source of hydraulic power for actuation of the motor, and rate control means for the motor including a variably positionable throttle valve, a cam for controlling the position of said valve, an actuating shaft journaled in the bed and supporting said cam, a dial on the shaft exterior to the bed for adjusting the cam variably to determine the position of the throttle valve, means for transmitting motion from the cam to the valve including a rock shaft supported by the bed, a valve actuating arm carried by the rock shaft, a follower arm carried by the rock shaft having a follower for engagement with the cam and movable by rotation of the cam and its supporting shaft variably to rock the rock shaft for positioning of the valve, a rate control plunger carried by the bed and projecting adjacent the table for engagement with a control cam on the table, motion transmitting linkage connecting the plunger and cam shaft for effecting rotation of the cam and cam shaft in accordance with movements of the plunger, and means for resiliently urging the plunger in a direction toward the table, said means including a hydraulic spring and a selector for determining the effectiveness of said hydraulic spring.

5. A machine tool including a bed, a table translatable on the bed, and means for controlling the rate and direction of movement of the table on the bed, said means including a hydraulic motor carried by the bed, drive connections between the motor and the table, a hydraulic pressure circuit for supplying actuating medium to the motor including a first pressure pump having a predetermined volumetric capacity and a second pressure pump, a pressure conduit supplied by the first pressure pump, a discharge circuit from the hydraulic motor including a throttle valve, means for varying the operative effect of the throttle valve to control the rate of table movement and discharge of the actuating medium utilized by the motor, a flow actuable valve plunger, means connecting the discharged actuating medium with said plunger, and valve means operable in response to actuation of the plunger additively to couple the second pressure pump discharge with the pressure conduit as the throttle determined motor discharge flow approaches said predetermined capacity of the first pump.

6. A machine tool including a bed, a table translatable on the bed, and means for controlling the rate and direction of movement of the table on the bed, said means including a hydraulic motor carried by the bed, drive connections between the motor and the table, a hydraulic pressure circuit for supplying actuating medium to the motor including a first pressure pump having a predetermined volumetric capacity and a second pressure pump, a pressure conduit supplied by the first pressure pump, a discharge circuit from the hydraulic motor including a throttle valve, means for varying the operative effect of the throttle valve to control the rate of table movement and discharge of the actuating medium utilized by the motor, a flow actuable valve plunger, means connecting the discharged actuating medium with said plunger, and valve means operable in response to actuation of the plunger additively to couple the second pressure pump discharge with the pressure conduit as the throttle determined motor discharge flow approaches said predetermined capacity of the first pump, a feed-rapid traverse selector valve shiftable to by-pass the motor return as respects the throttle valve and reduce the pressure in the motor discharge circuit, and means responsive to pressure drop in said discharge circuit also to operate said valve means to modify the individual or additive effectiveness of the pumps.

7. A machine tool including a bed, a table translatable on the bed, and means for controlling the rate and direction of movement of the table on the bed, said means including a hydraulic motor carried by the bed, drive connections between the motor and the table, a hydraulic pressure circuit for supplying actuating medium to the motor including a first pressure pump having a predetermined volumetric capacity and a second pressure pump, a pressure conduit supplied by the first pressure pump, a discharge circuit from the hydraulic motor including a throttle valve, means for varying the operative effect of the throttle valve to control the rate of table movement and discharge of the actuating medium utilized by the motor, a flow actuable valve plunger, means connecting the discharged actuating medium with said plunger, valve means operable in response to actuation of the plunger additively to couple the second pressure pump discharge with the pressure conduit as the throttle determined motor discharge flow approaches said predetermined capacity of the first pump, a feed-rapid traverse selector valve shiftable to by-pass the motor return as respects the throttle valve and reduce the pressure in the motor discharge circuit, and means responsive to pressure drop in said discharge circuit also to operate said valve means to modify the individual or additive effectiveness of the pumps, said throttle valve comprising a pair of relatively movable ported members having opposite rectangular port portions movable into overlapping relation on adjustment of the throttle to form a variable sized square discharge aperture of varying effectiveness proportional to the relative lineal movement of the parts.

8. A machine tool including a bed, a table translatable on the bed, and means for controlling the rate and direction of movement of the table on the bed, said means including a hydraulic motor carried by the bed, drive connections between the motor and the table, a hydraulic pressure circuit for supplying actuating medium to the motor including a first pressure pump having a predetermined volumetric capacity and a second pressure pump, a throttle valve operable to control the flow of actuating medium at the motor, means for varying the operative effect of the throttle valve to control the rate of table movement and discharge of the actuating medium utilized by the motor, a flow actuable valve plunger, means connecting the actuating medium discharged from the motor with said plunger, a pressure conduit supplied by the discharge from the first pressure pump, and valve means responsive to actuation of the valve plunger additively to couple the second pressure pump discharge with the pressure conduit as the motor discharge flow approaches said predetermined capacity of the first pump.

References Cited in the file of this patent

UNITED STATES PATENTS

| 1,982,711 | Vickers | Dec. 4, 1934 |
| 2,052,647 | Parsons | Sept. 1, 1936 |
| 2,713,772 | Horlacker | July 26, 1955 |